May 26, 1959 R. R. FIKE ET AL 2,887,766
COMPOSITE METAL ARTICLES
Original Filed June 27, 1955

Inventors:
Russell R. Fike and
Albert J. Pilous
By: Joseph R Dwyer Atty.

United States Patent Office 2,887,766
Patented May 26, 1959

2,887,766

COMPOSITE METAL ARTICLES

Russell R. Fike, Euclid, and Albert J. Pilous, Cleveland, Ohio, assignors to Borg-Warner Corporation, Chicago, Ill., a corporation of Illinois Original application June 27, 1955, Serial No. 518,046. Divided and this application October 26, 1956, Serial No. 620,994

10 Claims. (Cl. 29—183.5)

This application is a division of our copending application Serial No. 518,046, filed June 27, 1955.

This invention relates to the process of bonding metals of different characteristics and more particularly to a process of producing aluminum to bronze to babbitt bonds and to the composite articles so produced.

In our co-pending application, Serial No. 514,536 filed June 10, 1955, we have described a process of bonding aluminum and its alloys to heavier metals, such as copper-lead alloys, known as bronzes, and the articles so produced. Our co-pending application describes the difficulties hereinbefore encountered in making such bonds and the process by which these difficulties are successfully overcome, which process essentially comprises the bonding of the dissimilar metals by means of a bonding agent comprising tin. The purpose of the bonds therein described is to produce light weight structures, such as bearings and pump bushings, having copper-lead or bronze bearing surfaces, such bearing surfaces being preferable to those of aluminum.

It is well-known that bronze bearing surfaces have a tendency to seize during operation due to the lack of a uniform coating of oil or lubricant thereon, so that metal-to-metal contact between bearing surfaces is maintained. The seizure of such bearings may be successfully overcome by providing the bronze bearing surface with a thin layer of babbitt thereon. Also, foreign particles in contact with bronze bearing surfaces have a tendency to score the bearing surface thereby reducing the life of the bearing. Babbitts are possessed of a characteristic known as embedability, that is, foreign particles may easily become embedded in the babbitt and thereby prevent the scoring of the bearing surface. Therefore, the principal object of this invention is to provide a process of producing an aluminum to bronze to babbitt bond which provides a bond between the aluminum and bronze having maximum strength and ductility and with a babbitt layer on the bronze.

More particularly, the object of this invention is to provide a process of producing a bearing comprising an aluminum backing, a bronze member bonded thereto and a babbitt layer on the bronze, the babbitt layer preventing seizure of the bearing during operation and having the desired characteristic of embedability.

Still further, another object of this invention is to provide a process of producing a pump bushing comprising an aluminum member, a bronze surface thereon and a babbitt bearing surface on the bronze, the babbitt preventing seizure of the bearing face during operation and possessing the desired characteristic of embedability.

A still further object of this invention is to provide a composite bearing structure comprising an aluminum housing, a bronze member bonded to the housing and a babbitt bearing surface bonded to the bronze.

Still further, an object of this invention is to provide an aluminum pump bushing having a bronze face bonded thereto and having a babbitt bearing surface bonded to the bronze face.

These and other objects and features of this invention will become apparent from the following description when taken with the accompanying drawings showing the structure with the metal coatings being illustrated in exaggerated dimensions, and in which.

Figure 1:
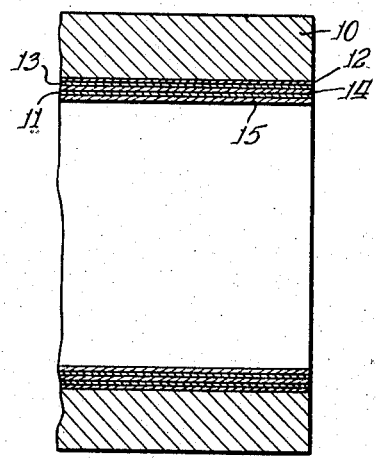
Figure 1 is a sectional view of a bearing member formed in accordance with this invention.
Figure 2:
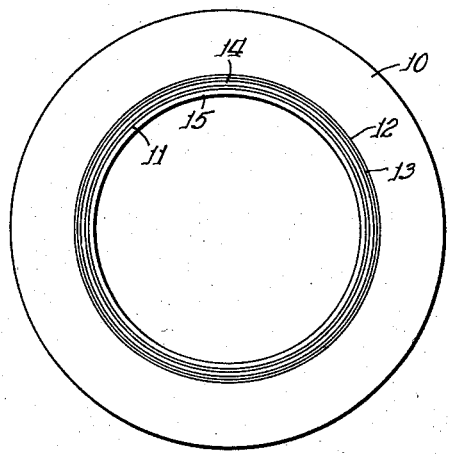
Figure 2 is an elevational view of the structure shown in Figure 1.

Reference is now made to Figures 1 and 2 wherein there is illustrated a lined bearing member comprising a housing or sleeve 10 of aluminum or an alloy composed mainly of aluminum, a bearing liner or bushing 11 of a copper-lead alloy, a flash or strike 12 of copper, a plating 13 of nickel on the housing and a bonding agent 14 of tin, bonding the housing and liner. Also, there is illustrated a layer 15 of babbitt on the liner or bushing 11.

As in our aforementioned co-pending application, a suitable copper-lead alloy may consist of 80% copper and 20% lead and a suitable aluminum alloy, known as 17S, having a composition of 2.5% copper, 0.5% Mg, 0.5% Mn, balance Al may be used. It is, of course, understood that other alloys having suitable properties may be employed in lieu of the above. With regard to the babbitt, there are many compositions thereof each having particular properties and the particular babbitt composition used depends upon the ultimate use of the article being produced.

In producing the structure thus described, the aluminum and bronze parts are first machined to the approximate shapes and the metals are prepared for bonding, as follows:

Preparation of the aluminum

1. Degrease to remove cutting oils.
2. Etch in 10% caustic soda for 10 minutes at room temperature.
3. Rinse in water at 140° F.
4. Dip in concentrated nitric acid from 5 to 10 seconds, or until all smut is removed.
5. Rinse in cold water.
6. Immerse in caustic zincate bath for 15 to 45 seconds. The work should be uniformly gray. If the work is spotty, repeat steps 4, 5 and 6.
7. Rinse in cold water.
8. Copper strike or flash.
9. Rinse in cold water.
10. Nickel plate 0.00002 inch in a Watts' type nickel bath with no brighteners.
11. Rinse in cold water.
12. Rinse in hot water.
13. Dry.
14. Apply a suitable flux to the metal and tin in molten tin at 550° to 700° F.

Preparation of the copper-lead liner

1. Clean and etch.
2. Apply a suitable flux to the metal and tin in molten tin at 550° to 700° F.

The copper and nickel coatings on the aluminum member provide a surface to which tin will readily adhere, since aluminum cannot be tinned directly because of the aluminum oxide film which forms instantly when aluminum is exposed to air. The copper is flashed on to the aluminum for good adherence, and the nickel is plated thereon to a thickness of at least 0.0002 inch. The usual thickness of the nickel plate is 0.0005 inch. Nickel is employed as a final plating on the aluminum member because it tins well and does not go into solution with tin too rapidly, thus allowing time to heat the aluminum member to tinning temperature by immersion in a tin bath. No brighteners are employed in the nickel bath since they tend to make the plated member brittle, which would adversely affect the strength of the bond being produced. The usual flux applied to the parts prior to tinning is a Du Pont product "Eureka #55," a highly active and corrosive acid chloride type. However, it should be understood that other fluxes may be employed in the process, and, it should further be noted that no flux is used after the parts are tinned; this latter procedure avoiding trapping of flux at the interface.

The temperature employed to tin the parts may be in the range of 550° to 700° F. When the tin pot is large, temperatures of 550° to 650° F. are usually employed. However, when the tin pot is small, that is, the volume of tin is relatively small, temperatures of 600° to 700° F. are advantageously employed because the metal parts tend to extract heat from the molten tin very rapidly.

After the component parts are prepared and while they are maintained at a temperature of 550° to 700° F. and while the tinned surfaces are molten, the component parts are assembled. Additional tin may be melted and flowed between the parts and pressure employed, if necessary. Upon cooling of the assembled structure, the bond between the aluminum and bronze is completed and the structure may then, and usually is, machined to final dimensions.

In the above description, the bonding material is referred to as being tin, and while it is generally pure tin, it must be understood that compositions composed mainly of tin may be employed in the process.

After the aluminum or aluminum alloy to bronze or copper-lead alloy structure is machined to final dimensions, any oxides on the structure are removed by etching the structure in a dilute nitric sulphuric etching bath. The babbitt layer may then be cast, in a conventional manner, on to the bronze surface and is usually cast thereon to a thickness of approximately 0.125 inch. After casting the babbitt, the structure is chilled by quenching the same in water at room temperature. The chilling operation determines the structure of the babbitt layer. By quenching, the chilling is accomplished rapidly, so that hard antimony particles in the babbitt will remain suspended therein and not migrate toward the bottom of the layer as when chilling occurs at a relatively slow rate, as by chilling in the ambient atmosphere. This results in a more uniform composition of the babbitt layer.

The completed structure may then be machined, so that there will be a micro-layer of babbitt on the bronze bearing surface. This final babbitt layer usually has a thickness of 0.002 to 0.005 inch.

Figure 3:
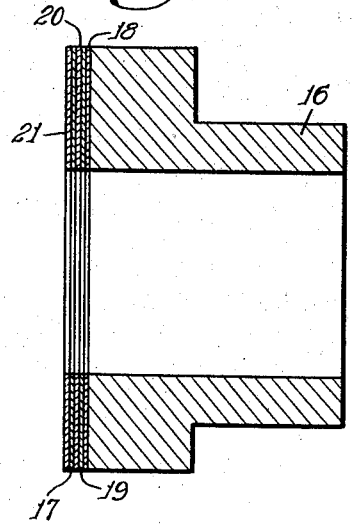
Figure 3 is a sectional view of a pump bushing formed in accordance with this invention.

Figure 3 represents a pump bushing structure as may be employed in a pressure loaded pump of the type shown and described in U.S. Patent No. 2,420,622 to John A. Lauk et al. The bushing structure comprises a bushing member 16, of aluminum or an aluminum alloy and a copper-lead alloy face 17, a copper flash or strike 18, a nickel plate 19 and a bonding agent 20, such as tin. Also, there is shown a babbitt layer 21 bonded to the surface of the face 17. The parts are prepared and assembled in the same manner as set forth with regard to the Figures 1 and 2 embodiment, and the same alloys may be employed. In producing the bond between the aluminum or aluminum alloy and the bronze or copper-lead alloy members in this embodiment, pressure is generally used to assure a perfect bond therebetween. While the tubular portion of the bushing is not illustrated as having the bronze and babbitt coatings thereon, it is to be understood that such coatings may be provided if necessary or desirable. These coatings may be internal or external on the tubular portion depending upon the operating conditions to be encountered.

While we have described our invention in connection with two embodiments thereof, it is to be understood that this is by way of illustration and not by way of limitation and the scope of our invention is defined solely by the appended claims which should be construed as broadly as the prior art will permit.

We claim:

1. A composite metal structure comprising an aluminum or aluminum alloy member, a plating of nickel on said member, a copper-lead alloy member, a layer comprising tin disposed between said nickel plated and said copper-lead alloy members, and a layer of babbitt on said copper-lead alloy member.

2. A composite metal structure comprising an aluminum or aluminum alloy member, a plating of nickel on the surface of said nickel having a thickness of at least 0.0002 inch, a copper-lead alloy member, a bonding layer comprising tin disposed between said nickel plated surface and said copper-lead alloy member, and a layer of babbitt bonded to said copper-lead alloy member.

3. A composite metal structure as recited in claim 2, wherein said first-named member comprises 2.5% Cu, 0.5% Mn, 0.5% Mg, balance Al, and wherein said second-named member comprises approximately 80% Cu and 20% Pb.

4. A composite bearing structure comprising an aluminum or aluminum alloy housing, a layer of nickel on said housing, a copper-lead alloy member, a bonding agent comprising tin disposed between said nickel plated housing and said copper-lead alloy member, and a layer of babbitt on said copper-lead alloy member.

5. A composite pump bushing comprising an aluminum or aluminum bushing member having a flat face thereon, a layer of nickel on said face, a copper-lead alloy facing element, and a bonding agent comprising tin disposed between said layer of nickel and said element, and a layer of babbitt bonded to said facing element.

6. A composite metal structure comprising an aluminum or aluminum alloy member, a copper flash and a plating of nickel on said member, a copper-lead alloy member, a layer comprising tin disposed between said nickel plated and said copper-lead alloy members, and a layer of babbitt on said copper-lead alloy member.

7. A composite metal structure comprising an aluminum or aluminum alloy member, a copper flash and a plating of nickel on the surface of said member, said plating of nickel having a thickness of at least 0.0002 inch, a copper-lead alloy member, a bonding layer comprising tin disposed between said nickel plated surface and said copper-lead alloy member, and a layer of babbitt bonded to said copper-lead alloy member.

8. A composite metal structure as recited in claim 7, wherein said first-named member comprises 2.5% Cu, 0.5% Mn, 0.5% Mg, balance Al, and wherein said second-named member comprises approximately 80% Cu and 20% Pb.

9. A composite bearing structure comprising an aluminum or aluminum alloy housing, a copper flash and a layer of nickel on said housing, a copper-lead alloy member, a bonding agent comprising tin disposed between said nickel plated housing and said copper-lead alloy member, and a layer of babbitt on said copper-lead alloy member.

10. A composite pump bushing comprising an aluminum or aluminum bushing member having a flat face thereon, a copper flash and a layer of nickel on said face, a copper-lead alloy facing element, and a bonding agent comprising tin disposed between said layer of nickel and said element, and a layer of babbitt bonded to said facing element.

(References on following page)

References Cited in the file of this patent

UNITED STATES PATENTS

| | | |
|---|---|---|
| 1,333,337 | Pack et al. | Mar. 9, 1920 |
| 1,530,374 | Kelley | Mar. 17, 1925 |
| 1,637,033 | Basch | July 26, 1927 |
| 1,770,582 | Pike | July 15, 1930 |
| 2,386,951 | Howe | Oct. 16, 1945 |
| 2,513,365 | Rogoff | July 4, 1950 |
| 2,741,016 | Roach | Apr. 10, 1956 |